United States Patent [19]

Sato et al.

[11] Patent Number: 5,216,964
[45] Date of Patent: Jun. 8, 1993

[54] ANGLE ADJUSTING DEVICE FOR CIRCULAR SAW WITH TABLE

[75] Inventors: Mitsumasa Sato; Kouichi Miyamoto, both of Tokyo, Japan

[73] Assignee: Ryobi Limited, Tokyo, Japan

[21] Appl. No.: 830,889

[22] Filed: Feb. 4, 1992

[30] Foreign Application Priority Data

Feb. 5, 1991 [JP] Japan ................................ 3-3911[U]

[51] Int. Cl.$^5$ .............................................. B27B 5/36
[52] U.S. Cl. .................... 83/471.3; 83/473; 83/477.1; 83/564; 83/581; 83/676; 83/699
[58] Field of Search .................. 83/471.3, 473, 477.1, 83/508.2, 564, 581, 676, 699

[56] References Cited

U.S. PATENT DOCUMENTS

| | | | |
|---|---|---|---|
| 4,581,966 | 4/1986 | Kaiser et al. | 83/397 |
| 4,934,233 | 6/1990 | Brundage et al. | 83/581 X |
| 5,054,352 | 10/1991 | Fushiya et al. | 83/471.3 X |

Primary Examiner—Frank T. Yost
Assistant Examiner—Raymond D. Woods
Attorney, Agent, or Firm—Brooks & Kushman

[57] ABSTRACT

A circular saw having a table on which a workpiece is laid in which a saw blade whose bevel angle can be adjusted is mounted on an operating arm which may be held in a raised position and a lowered position relative to the table. The circular saw includes a fixed support member fixed to the table, the fixed support member having a pair of recesses each of which has a slanted reception surface relative to a slide surface of the fixed support member; a movable support member mounted rotatably on the fixed support member for supporting the operating arm, the movable support member having a an arcuate guide hole, the movable support member having a pair of mount screw holes perpendicular to the reception surfaces; a stationary shaft which passes through the arcuate guide hole formed in the movable support member and which engages with the fixed support member; and a pair of adjusting screws which penetrate the mount screw holes and which are alternatively held in abutment with the reception surfaces.

10 Claims, 5 Drawing Sheets

ANGLE ADJUSTING DEVICE FOR CIRCULAR SAW WITH TABLE

BACKGROUND OF THE INVENTION

1. Field of the Invention:

The present invention relates to an angle adjusting device for a circular saw with a table, and more particularly to an angle adjusting device for a circular saw, in which a bevel angle of a saw blade for cutting a workpiece laid on a table may be adjusted as desired. The present invention also relates to a compound miter saw with a turn table.

2. Description of the Prior Art:

In general, in a circular saw with a table which is so called compound miter saw, a table having a central portion on which a workpiece is to be laid is rotatably mounted thereon. The circular saw is composed of an operating arm which may be held in an upright position and a fall down position relative to the table and a saw blade mounted on the operating arm. A bevel angle and a miter angle of the circular saw is adjustable as desired.

In such a circular saw with a table, in general, the bevel angle of the saw blade is set at angles of 0° and 45°. More specifically, in the prior art, as shown in FIGS. 6 and 7, a fastening bolt f which penetrates an elongated circular hole e formed in a movable support member d for supporting an operating arm is fastened to a screw hole c formed in a fixed support member b fixed to a table a, so that when the fastening bolt f is located at one of both the ends of the elongated hole e, the bevel angle is set at 0° or 45°. In addition, an adjusting screw g which passes through the movable support member d toward the elongated hole e is brought into abutment with the fastening bolt f so as to perform fine adjustment of the set angles.

However, in the conventional angle adjusting device, since the adjusting screw g is brought into abutment with the fastening bolt f for fastening and loosening the fixed support member b and the movable support member d to adjust the set angle at 0° or 45°, the adjusting screw g is in abutment with the fastening bolt f loosened upon the angle selection so that the angular displacement would be generated corresponding to an idle pitch of the screw portion generated by the loosening operation. Accordingly, if the fastening screw would be fastened under this condition, it would be impossible to accurately select a cutting angle of the saw blade.

In addition, since the adjusting screw g is brought into abutment with the fastening bolt f, the abutment would be unstable, and the fastening screw f would be damaged due to the repeated uses so that there would be a fear that the fastening of the fixed support member b and the movable support member d would not be well performed.

Moreover, since the adjusting screw g is projected outwardly, the aesthetic design would be worse and the projection of the screw head would obstruct the operator's work.

SUMMARY OF THE INVENTION

Accordingly, an object of the present invention is to provide an angle adjusting device for a circular saw having a table, in which it is possible to accurately adjust a bevel or cutting angle of a saw blade, and its overall size is compact.

In order to attain this or other objects, according to the present invention, there is provided a circular saw having a table on which a workpiece is laid in place, in which a saw blade whose bevel angle can be adjusted is mounted on an operating arm which may be held in an upright position and a fall down position relative to the table, comprising: a fixed support member fixed to the table, the fixed support member having a pair of recesses each provided with a slanted surface relative to a rotational surface of the fixed support member; a movable support member mounted rotatably on the fixed support member for supporting the operating arm, the movable support member having an arcuate guide hole and a pair of mount screw holes; a stationary shaft which passes through the arcuate guide hole formed in the movable support member and which engages with the fixed support member; and a pair of adjusting screws which penetrate the mount screw holes and which may be held in abutment with the reception surfaces.

The circular saw further comprises a rotary shaft with respect to which is concentrically arranged the arcuate guide hole of the movable support member. The movable support member is mounted rotatably on a rotational surface of the fixed support member. For example, the movable support member is rotatably mounted on the fixed support member through the rotary shaft. In this case, the arcuate guide hole formed in the movable support member is used to select the bevel angle and is identical with the set angle of the saw blade of the circular saw.

The above described reception surfaces are slanted relative to the slide surface of the fixed support member and are symmetrically formed toward the outside. It is preferable to form the mount surfaces for the adjusting screws in parallel with the reception surfaces and to form the mount surfaces directing from the outer surface of the movable support member toward the inside thereof. The adjusting screws may be each composed of a bolt and nut assembly.

According to the angle adjusting device of the invention, it is possible to accurately and stably adjust the bevel angle of the saw blade by vertically abutting the adjusting screws, which pass through the mount screw holes formed in the mount surface of the movable support member, against the reception surfaces slanted and recessed relative to the slide surface of the movable support member.

DESCRIPTION OF THE PREFERRED EMBODIMENTS

Figure 1:
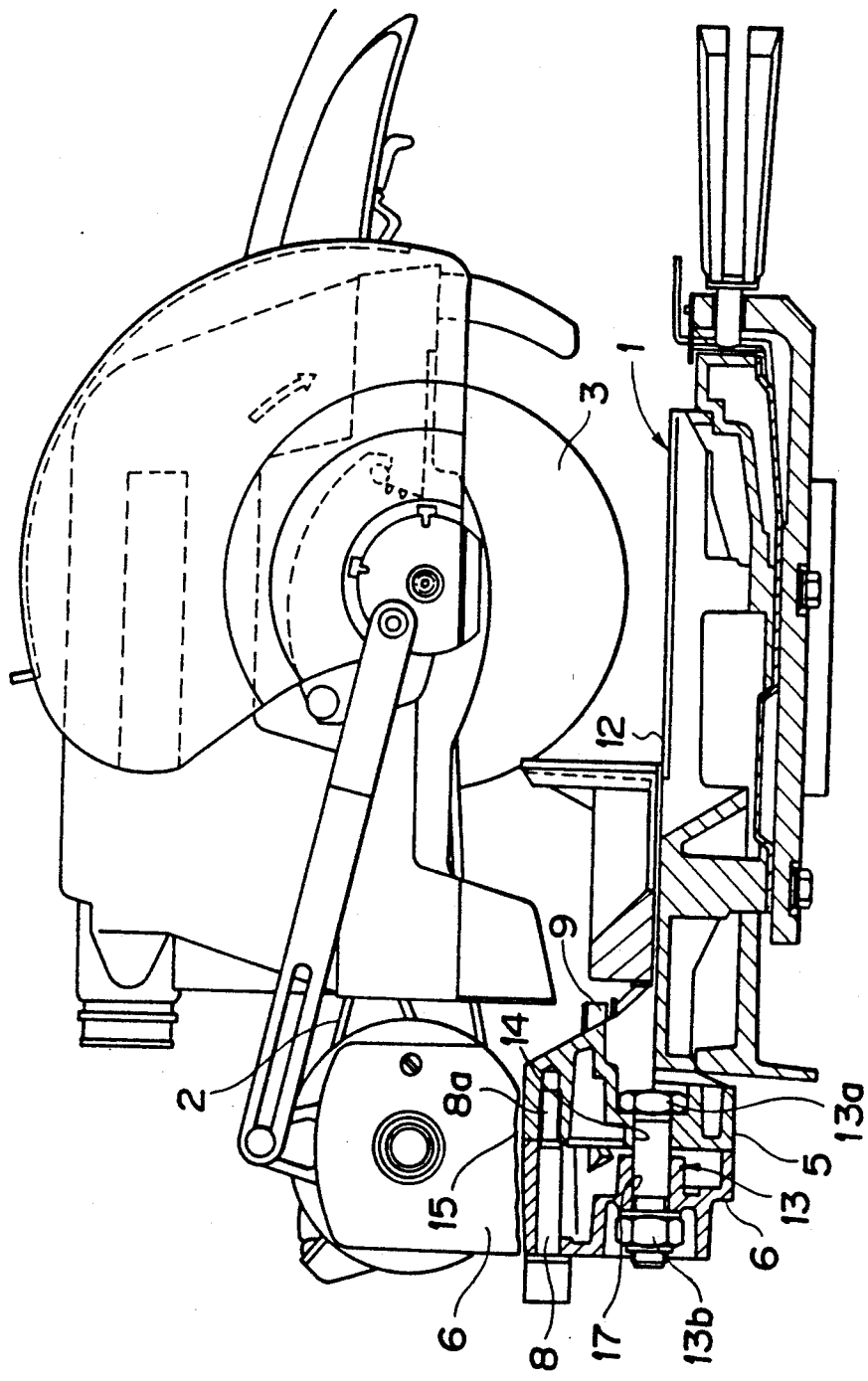
FIG. 1 is a side elevational sectional view showing a circular saw to which the angle adjusting device is applied.
Figure 2:
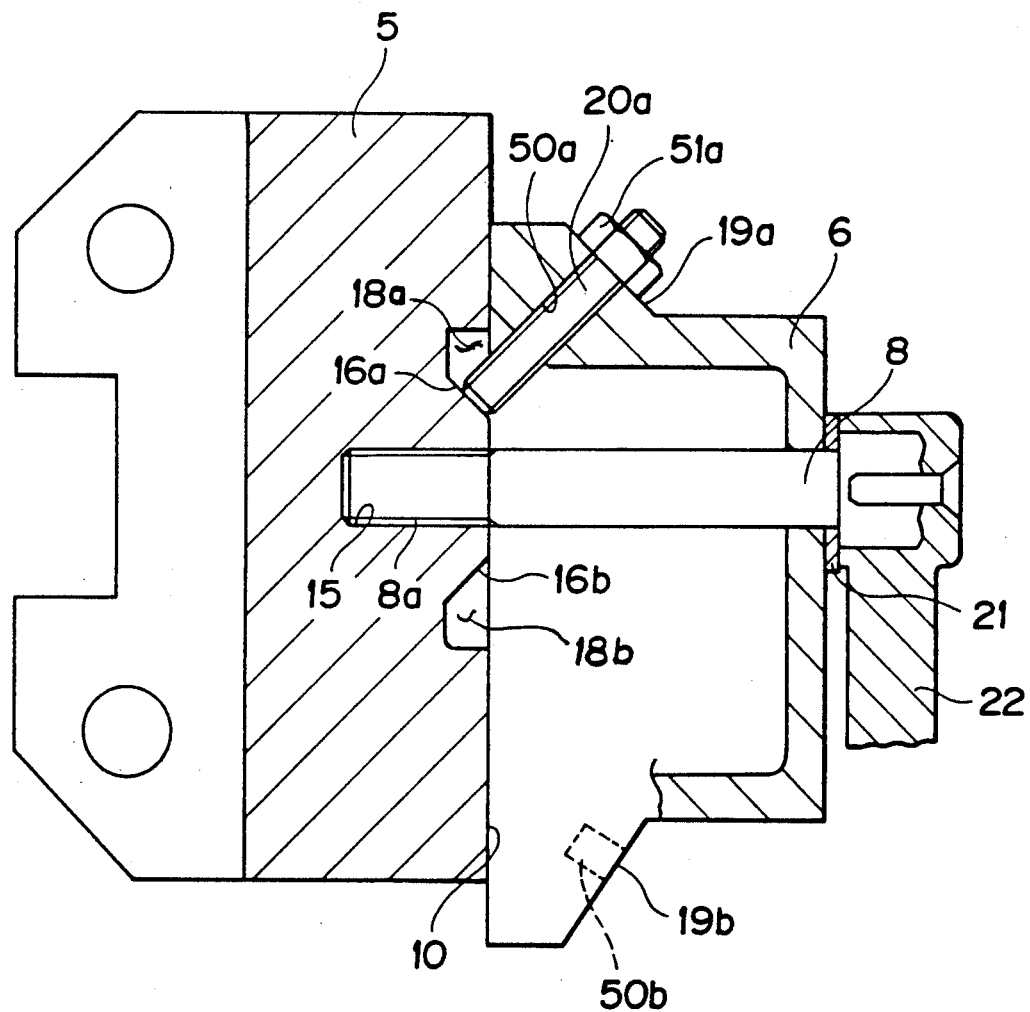
FIG. 2 is a cross sectional view showing an angle adjusting device according to the invention.

The present invention will now be described with reference to the accompanying drawings in which FIG. 1 is a side elevational sectional view showing a circular saw with a table and the angle adjusting device, and FIG. 2 is a cross sectional plan view showing a primary part of an angle adjusting device according to the invention.

As best shown in FIG. 1, the circular saw includes a table 1 on which a workpiece is to be laid, an operating arm 2 which is held in an raised position and a lowered position relative to a top surface of the table 1, a saw blade 3 mounted on the operating arm 2, and a motor (not shown) for drivingly rotating the saw blade.

Figure 3:
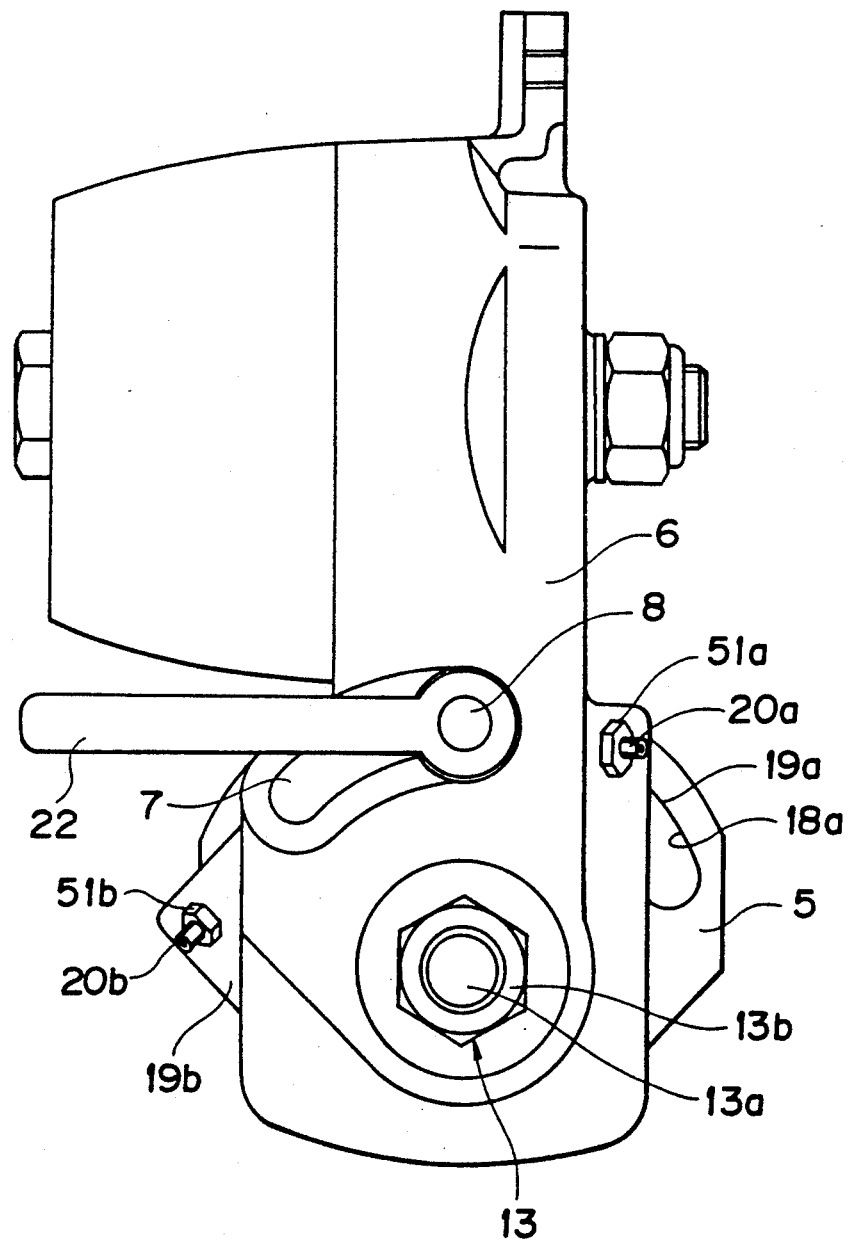
FIG. 3 is a front view showing the angle adjusting device.

As best shown in FIGS. 2 and 3, the angle adjusting device according to the invention to be mounted on the circular saw with the table as described above is composed mainly of a fixed support member 5 fixed to the table 1 (FIG. 1), a movable support member 6 rotatably mounted on the fixed support member 5 for supporting the operating arm 2 (FIG. 1), and a stationary shaft 8 which passes through an arcuate guide hole 7 formed in the movable support member 6 and which engages with the fixed support member 5.

Figure 4:
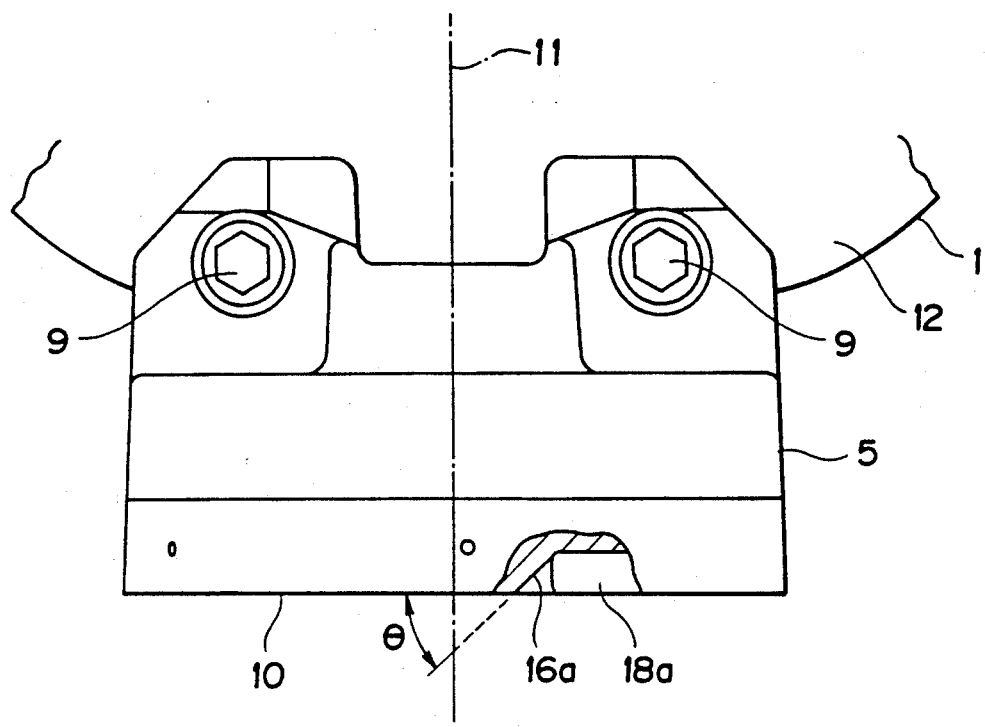
FIG. 4 is a plan view showing the fixed support member according to the invention.
Figure 5:
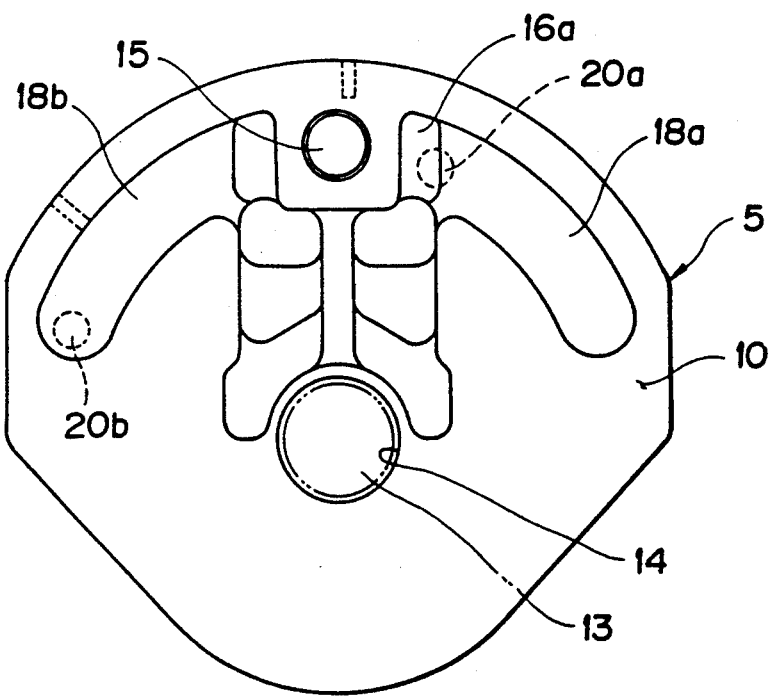
FIG. 5 is a front view showing the fixed support member shown in FIG. 4.
Figure 6:
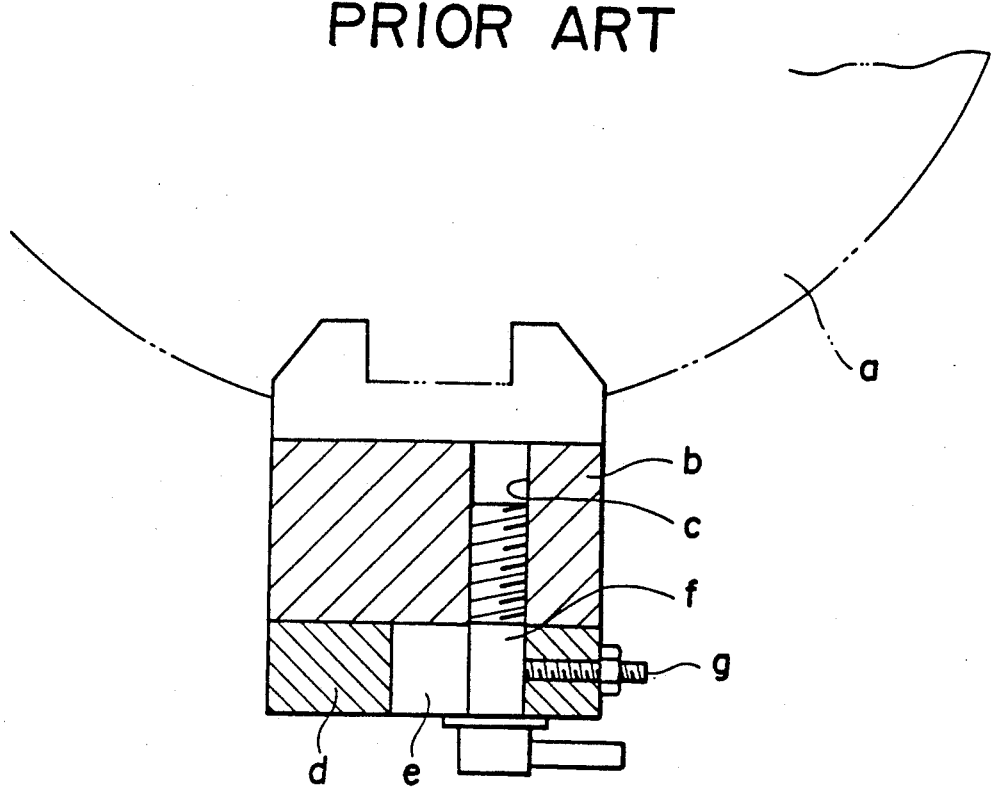
FIG. 6 is a sectional plan view showing a conventional adjusting device.
Figure 7:
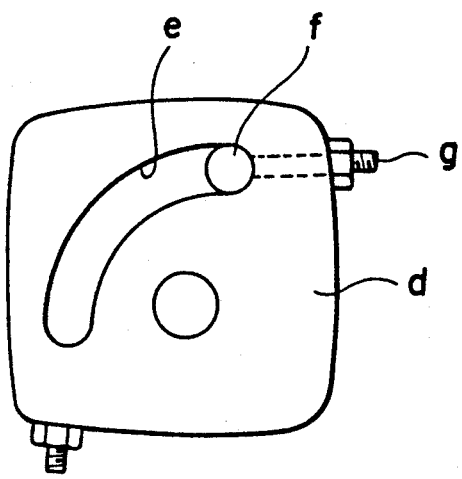
FIG. 7 is a front view showing the angle adjusting device shown in FIG. 6.

As shown in FIGS. 4 and 5, the fixed support member 5 is fixed vertically to a marginal portion of the circular table 1 by fastening bolts 9 with its slide surface 10 being fixed perpendicular to a centerline 11 and a top surface 12 of the table 1. A through hole 14 for a rotary shaft 13 for rotatably supporting the movable support member 6 (FIGS. 2 and 3) is formed in the fixed support member 5. A screw hole 15 with which threadedly engaged is a screw portion 8a (FIG. 2) of the stationary shaft 8 (FIG. 2) is formed on a concentric circle of the through hole 14.

Recessed reception surfaces 16a, 16b are formed symmetrically on the right and left positions in the slide surface 10 of the fixed support member 5 relative to the screw hole 15. That is, the fixed support member 5 has a pair of recessed arcuate guide grooves formed therein provided with slanted reception surfaces 16a, 16b. The pair of arcuate guide grooves 18a, 18b which are contiguous with the reception surfaces 16a, 16b and are formed in a concentric position with the through hole 14 in order to guide the front end of each adjusting screw 20a, 20b when the movable support member 6 is rotated. Accordingly, since the reception surfaces 16a, 16b and the guide grooves 18a, 18b are retracted from the rotational surface 10, it is easy to perform the machining work of the slide surface 10 which serves as a slide receiving surface. In this case, it should be noted that both the reception surfaces 16a, 16b are held at a predetermined angle $\theta$ relative to the slide surface 10 (see FIGS. 1 and 4).

On the other hand, in the movable support member 6, there is formed a through hole 17 through which the rotary shaft 13 passes. The arcuate guide hole 7 which may be in registration with the screw hole 15 of the fixed support member 5 is formed in a concentric manner with the through hole 17. In this case, the arcuate guide hole 7 has a length so that the movable support member 6 can be rotated about the rotary shaft 13 within an angle of 45° which is identical with the cutting angle of the saw blade 3.

A pair of mount surfaces 19a, 19b which are in parallel with the reception surfaces 16a, 16b are formed on both sides of the movable support member 6. A pair of mount screw holes 50a, 50b are formed so as to be perpendicular to the mount surface 19a, 19b. The end faces of two adjusting screws 20a, 20b which pass through the mount screw holes 19a, 19b may be brought into contact with the reception surfaces 16a, 16b in a perpendicular manner. Accordingly, either one of the adjusting screws 20a, 20b is brought into contact with an associated reception surface 16a or 16b, thereby setting the cutting angle of the saw blade 3 at 0° or 45°. In addition, the fastening degree of the adjusting screws 20a, 20b makes it possible to adjust the fine adjustment of the set angles. Since one of the adjusting screws 20a, 20b is brought into contact with an associated reception surface 16a or 16b which has the angle $\theta$ relative to the slide surface 10 of the fixed support member 5, it is possible to reduce the amount of projection of the adjusting screws 20a, 20b outside the movable support member 6, thereby enhancing the aesthetic design of the device, i.e., the overall circular saw and making the device compact. This also makes it easy to perform the adjusting operation.

In this case, the mount screws 20a, 20b have two fastening nuts 51a, 51b to be fastened to the mount surfaces 19a, 19b, respectively, and however, it is possible to form directly the mount thread holes in the movable support member 6.

The rotary shaft 13 is composed of a bolt 13a which passes through the through hole 14 of the fixed support member 5 and the through hole 17 of the movable support member 6 and a nut 13b which engages with the bolt 13a (see FIG. 2). A lever 22 is mounted through a seat 21 on an outer end portion of the stationary shaft 8. The rotation of the lever 22 makes it possible to fasten or loosen the screw portion 8a of the stationary shaft 8 relative to the screw hole 15 so that the movable support member 6 is fixed or slidingly rotatable relative to the fixed support member 5.

The setting operation of the saw blade 3 at 0° or 45° with the thus constructed angle adjusting device according to the invention will be carried out as follows.

First of all, the lever 22 is rotated, thereby loosening the stationary shaft 8. The movable support member 6 is rotated about the rotary shaft 13 so that the end face of one of the adjusting screws 20a, 20b is brought into abutment with a reception surface 16a or 16b. In FIG. 5, when the adjusting screw 20a abuts the reception surface 16a, the other adjusting screw 20b is located at the lower end of the groove 18b. When the bevel angle is adjusted, each of the screws 20a, 20b is moved along each of the grooves 18a, 18b. Subsequently, the fastening amount of the adjusting screws 20a, 20b is adjusted to thereby perform the adjustment of the saw blade 3.

The thus constructed angle adjusting device according to the invention may enjoy the following effects:

1) Since the adjusting screws are in abutment with the reception surfaces formed in the fixed support member, it is possible to accurately set the cutting angle of the saw blade under the stable condition.

2) Since the reception surfaces are formed in a recessed fashion relative to the slide surface of the fixed support member, it is possible to readily perform the machining work of the slide surface as a sliding surface.

3) Since the reception surfaces are formed at a desired angle relative to the slide surface of the fixed support member and the adjusting screws are brought into contact with the reception surfaces, it is possible to reduce the projection amount of the adjusting screws to the outside, it is also possible to enhance the aesthetic design of the overall device, it is possible to make the device compact and it is easy to perform the adjusting work of the adjusting screws.

What is claimed is:

1. A circular saw having a table on which a workpiece is laid in place, wherein a saw blade, having an adjustable bevel angle, is mounted on an operating arm movable between a raised position and a lowered position relative to the table, comprising:
   - a fixed support member affixed to said table, said fixed support member having a slide surface with a pair of recessed, slanted reception surfaces inclined relative to said slide surface;
   - a movable support member mounted rotatably to said fixed support member slide surface and having an arcuate guide hole and a pair of mount screw holes formed therein, said movable support member including means for supporting the operating arm;
   - a stationary shaft which passes through said arcuate guide hole formed in said movable support member and which engages with said fixed support member; and
   - a pair of adjusting screws cooperating with said mount screw holes having ends which alternatively abut said reception surfaces to establish two preset bevel angle stops.

2. The circular saw according to claim 1, wherein the fixed support is provided with a pair of arcuate guide grooves formed contiguously with the reception surfaces in order to provide clearance for said adjusting screws as the movable support is rotated when the bevel angle is adjusted.

3. The circular saw according to claim 2, further comprising a rotary shaft for rotatably supporting the movable support member with respect to the fixed support member for relative movement about the rotary shaft axis.

4. The circular saw according to claim 2, wherein said adjusting screws are each composed of a screw and stop nut assembly.

5. The circular saw according to claim 2, wherein said bevel angle stops are presetable at 0° and 45°.

6. The circular saw according to claim 2, wherein the movable support member is provided with a pair of mount surfaces for mounting the adjusting screws thereon, the mount surfaces being formed generally parallel to the reception surfaces when an adjusting screw is in engagement with a respective reception surface.

7. The circular saw according to claim 1, further comprising a rotary shaft for rotatably supporting the movable support member with respect to the fixed support member for relative movement about the rotary shaft axis.

8. The circular saw according to claim 1, wherein said adjusting screws are each composed of a screw and stop nut assembly.

9. The circular saw according to claim 1, wherein said bevel angle stops are presetable at 0° and 45°.

10. The circular saw according to claim 1, wherein the movable support member is provided with a pair of mount surfaces for mounting the adjusting screws thereon, the mount surfaces being formed generally parallel to the reception surfaces when an adjusting screw is in engagement with a respective reception surface.

* * * * *